(12) United States Patent
Rule et al.

(10) Patent No.: US 10,467,445 B1
(45) Date of Patent: Nov. 5, 2019

(54) DEVICES AND METHODS FOR CONTACTLESS CARD ALIGNMENT WITH A FOLDABLE MOBILE DEVICE

(71) Applicant: Capital One Services, LLC, McLean, VA (US)

(72) Inventors: Jeffrey Rule, Chevy Chase, MD (US); Rajko Ilincic, Annandale, VA (US); Colin Hart, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/367,892

(22) Filed: Mar. 28, 2019

(51) Int. Cl.
| | |
|---|---|
| *G06K 7/10* | (2006.01) |
| *A63F 13/95* | (2014.01) |
| *A63F 13/00* | (2014.01) |
| *A63F 13/20* | (2014.01) |
| *G06K 7/015* | (2006.01) |
| *G06Q 20/34* | (2012.01) |
| *G06K 19/07* | (2006.01) |

(Continued)

(52) U.S. Cl.
CPC ........... *G06K 7/10366* (2013.01); *A63F 13/00* (2013.01); *A63F 13/20* (2014.09); *A63F 13/95* (2014.09); *G06K 7/0056* (2013.01); *G06K 7/015* (2013.01); *G06K 7/10316* (2013.01); *G06K 7/10386* (2013.01); *G06K 19/005* (2013.01); *G06K 19/0723* (2013.01); *G06Q 20/34* (2013.01); *G06Q 20/341* (2013.01)

(58) Field of Classification Search
CPC ......... G06K 19/0723; G06K 19/07749; G06K 7/015; G06K 7/10336; G06K 7/10386; G09G 2370/16
See application file for complete search history.

(56) References Cited

U.S. PATENT DOCUMENTS

| | | | |
|---|---|---|---|
| 4,827,113 A | 5/1989 | Rikuna | |
| 4,910,773 A | 3/1990 | Hazard et al. | |

(Continued)

FOREIGN PATENT DOCUMENTS

| | | |
|---|---|---|
| CA | 3010336 A1 | 7/2017 |
| CN | 101192295 A | 6/2008 |

(Continued)

OTHER PUBLICATIONS

Haykin, M. and Warnar, R., "Smart Card Technology: New Methods for Computer Access Control", Computer Science and Technology NIST Special Publication 500-157:1-60 (1988).

(Continued)

*Primary Examiner* — Christopher Stanford

(57) ABSTRACT

Example embodiments of systems, methods, and devices for transaction card alignment are provided. In one example embodiment, a mobile device may include a first component and a second component foldable with respect to one another between a first configuration and a second configuration. The mobile device may further include a screen interface on an interior side of the first component, and an alignment feature along the interior side, the alignment feature providing alignment for a contactless card with respect to the screen interface, wherein the contactless card is uncovered by the second component in the first configuration and covered by the second component in the second configuration.

20 Claims, 9 Drawing Sheets

(51) Int. Cl.
    *G06K 19/00*    (2006.01)
    *G06K 7/00*    (2006.01)

(56) References Cited

U.S. PATENT DOCUMENTS

| | | | |
|---|---|---|---|
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,436,969 A * | 7/1995 | Kobayashi | H04B 1/3816 |
| | | | 379/433.08 |
| 5,533,126 A | 7/1996 | Hazard | |
| 5,592,553 A | 1/1997 | Guski et al. | |
| 5,616,901 A | 4/1997 | Crandall | |
| 5,666,415 A | 9/1997 | Kaufman | |
| 5,763,373 A | 6/1998 | Robinson et al. | |
| 5,764,789 A | 6/1998 | Pare, Jr. et al. | |
| 5,796,827 A | 8/1998 | Coppersmith et al. | |
| 5,832,090 A | 11/1998 | Raspotnik | |
| 5,883,810 A | 3/1999 | Franklin et al. | |
| 5,901,874 A | 5/1999 | Deters | |
| 5,960,411 A | 9/1999 | Hartman et al. | |
| 6,049,328 A | 4/2000 | Vanderheiden | |
| 6,058,373 A | 5/2000 | Blinn et al. | |
| 6,061,666 A | 5/2000 | Do et al. | |
| 6,105,013 A | 8/2000 | Curry et al. | |
| 6,199,114 B1 | 3/2001 | White et al. | |
| 6,199,762 B1 | 3/2001 | Hohle | |
| 6,216,227 B1 | 4/2001 | Goldstein et al. | |
| 6,227,447 B1 | 5/2001 | Campisano | |
| 6,282,522 B1 | 8/2001 | Davis et al. | |
| 6,324,271 B1 | 11/2001 | Sawyer et al. | |
| 6,367,011 B1 | 4/2002 | Lee et al. | |
| 6,402,028 B1 | 6/2002 | Graham, Jr. et al. | |
| 6,438,550 B1 | 8/2002 | Doyle et al. | |
| 6,501,847 B2 | 12/2002 | Helot et al. | |
| 6,631,197 B1 | 10/2003 | Taenzer | |
| 6,641,050 B2 | 11/2003 | Kelley et al. | |
| 6,651,881 B1 * | 11/2003 | Choiset | G06K 7/0013 |
| | | | 235/380 |
| 6,655,585 B2 | 12/2003 | Shinn | |
| 6,662,020 B1 | 12/2003 | Aaro et al. | |
| 6,721,706 B1 | 4/2004 | Strubbe et al. | |
| 6,779,115 B1 | 8/2004 | Naim | |
| 6,792,533 B2 | 9/2004 | Jablon | |
| 6,806,835 B2 * | 10/2004 | Iwai | H01Q 1/08 |
| | | | 343/702 |
| 6,829,711 B1 | 12/2004 | Kwok et al. | |
| 6,834,271 B1 | 12/2004 | Hodgson et al. | |
| 6,834,795 B1 | 12/2004 | Rasmussen et al. | |
| 6,852,031 B1 | 2/2005 | Rowe | |
| 6,865,547 B1 | 3/2005 | Brake, Jr. et al. | |
| 6,873,260 B2 | 3/2005 | Lancos et al. | |
| 6,877,656 B1 | 4/2005 | Jaros et al. | |
| 6,889,198 B2 | 5/2005 | Kawan | |
| 6,905,411 B2 | 6/2005 | Nguyen et al. | |
| 6,910,627 B1 | 6/2005 | Simpson-Young et al. | |
| 6,971,031 B2 | 11/2005 | Haala | |
| 6,973,327 B2 * | 12/2005 | Seita | H01Q 1/2283 |
| | | | 455/550.1 |
| 6,990,588 B1 | 1/2006 | Yasukura | |
| 7,006,986 B1 | 2/2006 | Sines et al. | |
| 7,085,931 B1 | 8/2006 | Smith et al. | |
| 7,128,274 B2 | 10/2006 | Kelley et al. | |
| 7,140,550 B2 | 11/2006 | Ramachandran | |
| 7,152,045 B2 | 12/2006 | Hoffman | |
| 7,165,727 B2 | 1/2007 | de Jong | |
| 7,167,158 B2 * | 1/2007 | Silverbrook | G06Q 50/00 |
| | | | 345/156 |
| 7,175,076 B1 | 2/2007 | Block et al. | |
| 7,202,773 B1 | 4/2007 | Oba et al. | |
| 7,206,806 B2 | 4/2007 | Pineau | |
| 7,232,073 B1 | 6/2007 | de Jong | |
| 7,246,752 B2 | 7/2007 | Brown | |
| 7,254,569 B2 | 8/2007 | Goodman et al. | |
| 7,263,507 B1 | 8/2007 | Brake, Jr. et al. | |
| 7,270,276 B2 | 9/2007 | Vayssiere | |
| 7,278,025 B2 | 10/2007 | Saito et al. | |
| 7,287,692 B1 | 10/2007 | Patel et al. | |
| 7,290,709 B2 | 11/2007 | Tsai et al. | |
| 7,290,718 B2 * | 11/2007 | Sekita | G06F 1/162 |
| | | | 235/492 |
| 7,306,143 B2 | 12/2007 | Bonneau, Jr. et al. | |
| 7,319,986 B2 | 1/2008 | Praisner et al. | |
| 7,374,099 B2 | 5/2008 | de Jong | |
| 7,375,616 B2 | 5/2008 | Rowse et al. | |
| 7,380,710 B2 | 6/2008 | Brown | |
| 7,424,977 B2 | 9/2008 | Smets et al. | |
| 7,453,439 B1 | 11/2008 | Kushler et al. | |
| 7,472,829 B2 | 1/2009 | Brown | |
| 7,487,357 B2 | 2/2009 | Smith et al. | |
| 7,568,631 B2 | 8/2009 | Gibbs et al. | |
| 7,584,153 B2 | 9/2009 | Brown et al. | |
| 7,597,250 B2 | 10/2009 | Finn | |
| 7,628,322 B2 | 12/2009 | Holtmanns et al. | |
| 7,652,578 B2 | 1/2010 | Braun et al. | |
| 7,689,832 B2 | 3/2010 | Talmor et al. | |
| 7,748,617 B2 | 7/2010 | Gray | |
| 7,748,636 B2 | 7/2010 | Finn | |
| 7,762,457 B2 | 7/2010 | Bonalle et al. | |
| 7,789,302 B2 | 9/2010 | Tame | |
| 7,793,851 B2 | 9/2010 | Mullen | |
| 7,796,013 B2 | 9/2010 | Murakami et al. | |
| 7,801,799 B1 | 9/2010 | Brake, Jr. et al. | |
| 7,801,829 B2 | 9/2010 | Gray et al. | |
| 7,809,643 B2 | 10/2010 | Phillips et al. | |
| 7,827,115 B2 | 11/2010 | Weller et al. | |
| 7,828,214 B2 | 11/2010 | Narendra et al. | |
| 7,848,746 B2 | 12/2010 | Juels | |
| 7,882,553 B2 | 2/2011 | Tuliani | |
| 7,908,216 B1 | 3/2011 | Davis et al. | |
| 7,922,082 B2 | 4/2011 | Muscato | |
| 7,933,589 B1 | 4/2011 | Mamdani et al. | |
| 7,949,559 B2 | 5/2011 | Freiberg | |
| 7,954,716 B2 | 6/2011 | Narendra et al. | |
| 7,954,723 B2 | 6/2011 | Charrat | |
| 7,962,369 B2 | 6/2011 | Rosenberg | |
| 7,993,197 B2 | 8/2011 | Kaminkow | |
| 8,005,426 B2 | 8/2011 | Huomo et al. | |
| 8,010,405 B1 | 8/2011 | Bortolin et al. | |
| 8,041,954 B2 | 10/2011 | Plesman | |
| 8,060,012 B2 | 11/2011 | Sklovsky et al. | |
| 8,074,877 B2 | 12/2011 | Mullen et al. | |
| 8,082,450 B2 | 12/2011 | Frey et al. | |
| 8,095,113 B2 | 1/2012 | Kean et al. | |
| 8,099,332 B2 | 1/2012 | Lemay et al. | |
| 8,127,143 B2 | 2/2012 | Abdallah et al. | |
| 8,135,648 B2 | 3/2012 | Oram et al. | |
| 8,140,010 B2 | 3/2012 | Symons et al. | |
| 8,141,136 B2 | 3/2012 | Lee et al. | |
| 8,150,321 B2 | 4/2012 | Winter et al. | |
| 8,150,767 B2 | 4/2012 | Wankmueller | |
| 8,186,602 B2 | 5/2012 | Itay et al. | |
| 8,196,131 B1 | 6/2012 | von Behren et al. | |
| 8,224,753 B2 | 7/2012 | Atef et al. | |
| 8,232,879 B2 | 7/2012 | Davis | |
| 8,233,841 B2 | 7/2012 | Griffin et al. | |
| 8,245,292 B2 | 8/2012 | Buer | |
| 8,249,654 B1 | 8/2012 | Zhu | |
| 8,266,451 B2 | 9/2012 | Leydier et al. | |
| 8,285,329 B1 | 10/2012 | Zhu | |
| 8,302,872 B2 | 11/2012 | Mullen | |
| 8,312,519 B1 | 11/2012 | Bailey et al. | |
| 8,316,237 B1 | 11/2012 | Felsher et al. | |
| 8,332,272 B2 | 12/2012 | Fisher | |
| 8,365,988 B1 | 2/2013 | Medina, III et al. | |
| 8,369,960 B2 | 2/2013 | Tran et al. | |
| 8,371,501 B1 | 2/2013 | Hopkins | |
| 8,391,719 B2 | 3/2013 | Alameh et al. | |
| 8,393,535 B1 * | 3/2013 | Yee | G06K 19/07741 |
| | | | 235/380 |
| 8,417,231 B2 | 4/2013 | Sanding et al. | |
| 8,439,271 B2 | 5/2013 | Smets et al. | |
| 8,475,367 B1 | 7/2013 | Yuen et al. | |
| 8,489,112 B2 | 7/2013 | Roeding et al. | |

(56) References Cited

U.S. PATENT DOCUMENTS

| | | |
|---|---|---|
| 8,559,872 B2 | 10/2013 | Butler |
| 8,566,916 B1 | 10/2013 | Bailey et al. |
| 8,567,670 B2 | 10/2013 | Stanfield et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Marshall Chesney et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van OS et al. |
| 9,332,587 B2 | 5/2016 | Salahshoor |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,940,571 B1 | 4/2018 | Herrington |
| 9,953,323 B2 | 4/2018 | Candelore et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,033,437 B1* | 7/2018 | Bimbaud ............... H02J 7/025 |
| 10,043,164 B2 | 8/2018 | Dogin et al. |
| 10,075,437 B1 | 9/2018 | Costigan et al. |
| 10,129,648 B1 | 11/2018 | Hernandez Santisteban et al. |
| 10,133,979 B1 | 11/2018 | Eidam et al. |
| 10,217,105 B1 | 2/2019 | Sangi et al. |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0208449 A1 | 11/2003 | Diao |
| 2004/0127256 A1 | 7/2004 | Goldthwaite et al. |
| 2004/0171405 A1* | 9/2004 | Amano ............... G06Q 20/341 |
| | | 455/556.2 |
| 2004/0189625 A1* | 9/2004 | Sato ............... G06K 19/07749 |
| | | 345/204 |
| 2004/0215674 A1 | 10/2004 | Odinak et al. |
| 2004/0230799 A1 | 11/2004 | Davis |
| 2005/0075985 A1 | 4/2005 | Cartmell |
| 2005/0081038 A1 | 4/2005 | Arditti Modiano et al. |
| 2005/0156026 A1 | 7/2005 | Ghosh et al. |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |
| 2006/0041402 A1 | 2/2006 | Baker |
| 2006/0044153 A1 | 3/2006 | Dawidowsky |
| 2006/0085848 A1 | 4/2006 | Aissi et al. |
| 2006/0097048 A1* | 5/2006 | Mori ............... G06K 19/07749 |
| | | 235/439 |
| 2006/0136334 A1 | 6/2006 | Atkinson et al. |
| 2006/0157566 A1* | 7/2006 | Kawasaki ............ G06K 7/0008 |
| | | 235/451 |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |

(56) References Cited

U.S. PATENT DOCUMENTS

| | | |
|---|---|---|
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0312634 A1 | 12/2010 | Cervenka |
| 2010/0312635 A1 | 12/2010 | Cervenka |
| 2011/0035604 A1 | 2/2011 | Habraken |
| 2011/0060631 A1 | 3/2011 | Grossman et al. |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0210825 A1* | 9/2011 | Murakami .......... G06K 7/0008 340/10.1 |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0143754 A1 | 6/2012 | Patel |
| 2012/0150737 A1 | 6/2012 | Rottink et al. |
| 2012/0168503 A1* | 7/2012 | Phillips .......... G06Q 20/352 235/439 |
| 2012/0178366 A1 | 7/2012 | Levy et al. |
| 2012/0196583 A1 | 8/2012 | Kindo |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0284194 A1 | 11/2012 | Liu et al. |
| 2012/0290449 A1* | 11/2012 | Mullen .......... G06Q 10/00 705/27.2 |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0026229 A1 | 1/2013 | Jarman et al. |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0217443 A1* | 8/2013 | Lim .......... H04M 1/0216 455/566 |
| 2013/0226796 A1 | 8/2013 | Jiang et al. |
| 2013/0232082 A1 | 9/2013 | Krawczewicz et al. |
| 2013/0233924 A1* | 9/2013 | Burns .......... G06K 7/0021 235/441 |
| 2013/0238894 A1 | 9/2013 | Ferg et al. |
| 2013/0303085 A1 | 11/2013 | Boucher et al. |
| 2013/0304651 A1 | 11/2013 | Smith |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0004795 A1* | 1/2014 | Kawashimo .......... H04B 5/00 455/41.1 |
| 2014/0006771 A1* | 1/2014 | Cowcher .......... G06K 19/07327 713/100 |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0074637 A1 | 3/2014 | Hammad |
| 2014/0074655 A1 | 3/2014 | Lim et al. |
| 2014/0080411 A1* | 3/2014 | Konanur .......... H04B 5/0031 455/41.1 |
| 2014/0081720 A1 | 3/2014 | Wu |
| 2014/0081874 A1* | 3/2014 | Lewis .......... G07F 19/205 705/72 |
| 2014/0171034 A1 | 6/2014 | Aleksin et al. |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0009190 A1* | 1/2015 | Kuwahara .......... G09G 3/2092 345/205 |
| 2015/0012444 A1 | 1/2015 | Brown et al. |
| 2015/0032635 A1 | 1/2015 | Guise |
| 2015/0089586 A1 | 3/2015 | Ballesteros |
| 2015/0170138 A1 | 6/2015 | Rao |
| 2015/0178724 A1 | 6/2015 | Ngo et al. |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0339474 A1 | 11/2015 | Paz et al. |
| 2015/0371234 A1 | 12/2015 | Huang et al. |
| 2015/0372721 A1* | 12/2015 | Bard .......... H04B 5/0075 455/575.8 |
| 2016/0048913 A1 | 2/2016 | Rausaria et al. |
| 2016/0055480 A1 | 2/2016 | Shah |
| 2016/0057619 A1 | 2/2016 | Lopez |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0260086 A1* | 9/2016 | Cho .......... G06Q 20/3278 |
| 2016/0267486 A1 | 9/2016 | Mitra et al. |
| 2016/0277383 A1* | 9/2016 | Guyomarc'h .......... H04L 63/083 |
| 2016/0277388 A1 | 9/2016 | Lowe et al. |
| 2016/0287998 A1* | 10/2016 | Kawanabe .......... G06K 19/0723 |

(56) References Cited

U.S. PATENT DOCUMENTS

| | | | |
|---|---|---|---|
| 2016/0307187 A1 | 10/2016 | Guo et al. | |
| 2016/0307189 A1 | 10/2016 | Zarakas et al. | |
| 2016/0314472 A1 | 10/2016 | Ashfield | |
| 2016/0330027 A1 | 11/2016 | Ebrahimi | |
| 2016/0335531 A1 | 11/2016 | Mullen et al. | |
| 2016/0360348 A1* | 12/2016 | Ueda | G09G 5/00 |
| 2016/0379217 A1 | 12/2016 | Hammad | |
| 2017/0011395 A1 | 1/2017 | Pillai et al. | |
| 2017/0011406 A1 | 1/2017 | Tunnell et al. | |
| 2017/0017957 A1 | 1/2017 | Radu | |
| 2017/0017964 A1 | 1/2017 | Janefalkar et al. | |
| 2017/0024716 A1 | 1/2017 | Jiam et al. | |
| 2017/0039566 A1 | 2/2017 | Schipperheijn | |
| 2017/0068950 A1 | 3/2017 | Kwon | |
| 2017/0103388 A1 | 4/2017 | Pillai et al. | |
| 2017/0104739 A1 | 4/2017 | Lansler et al. | |
| 2017/0109509 A1 | 4/2017 | Baghdasaryan | |
| 2017/0109730 A1 | 4/2017 | Locke et al. | |
| 2017/0116447 A1 | 4/2017 | Cimino et al. | |
| 2017/0124568 A1 | 5/2017 | Moghadam | |
| 2017/0140379 A1 | 5/2017 | Deck | |
| 2017/0154328 A1 | 6/2017 | Zarakas et al. | |
| 2017/0154333 A1 | 6/2017 | Gleeson et al. | |
| 2017/0180134 A1 | 6/2017 | King | |
| 2017/0230189 A1 | 8/2017 | Toll et al. | |
| 2017/0237301 A1 | 8/2017 | Elad et al. | |
| 2017/0255324 A1* | 9/2017 | Oka | G06F 3/0412 |
| 2017/0316696 A1 | 11/2017 | Bartel | |
| 2017/0317834 A1 | 11/2017 | Smith et al. | |
| 2017/0330173 A1 | 11/2017 | Woo et al. | |
| 2017/0374070 A1 | 12/2017 | Shah et al. | |
| 2018/0034507 A1 | 2/2018 | Wobak et al. | |
| 2018/0039986 A1 | 2/2018 | Essebag et al. | |
| 2018/0068316 A1 | 3/2018 | Essebag et al. | |
| 2018/0129945 A1 | 5/2018 | Saxena et al. | |
| 2018/0160255 A1 | 6/2018 | Park | |
| 2018/0191501 A1 | 7/2018 | Lindemann | |
| 2018/0205712 A1 | 7/2018 | Versteeg et al. | |
| 2018/0240106 A1 | 8/2018 | Garrett et al. | |
| 2018/0254909 A1 | 9/2018 | Hancock | |
| 2018/0268132 A1 | 9/2018 | Buer et al. | |
| 2018/0270214 A1 | 9/2018 | Caterino et al. | |
| 2018/0294959 A1 | 10/2018 | Traynor et al. | |
| 2018/0300716 A1 | 10/2018 | Carlson | |
| 2018/0302396 A1 | 10/2018 | Camenisch et al. | |
| 2018/0315050 A1 | 11/2018 | Hammad | |
| 2018/0316666 A1 | 11/2018 | Koved et al. | |
| 2018/0322486 A1 | 11/2018 | Deliwala et al. | |
| 2019/0043038 A1* | 2/2019 | Jang | G06K 9/00671 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Lehpamer, H., "Component of the RFID System", RFID Design Principles, 2nd edition pp. 133-201 (2012).

Author Unknown, "CardrefresherSM from American Express®", [online] 2019 [retrieved on Mar. 25, 2019]. Retrieved fro Internet URL: https://merchant-channel.americanexpress.com/merchant/en_US/cardrefresher, 2 pages.

Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.

Author Unknown, "Visa® Account Updater for Merchants", [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author Unknown, "NFC Guide: All You Need to Know About Near Field Communication", Square Guide [online] 2018 [retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Author Unknown, "Tap & Go Device Setup", Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

(56) References Cited

OTHER PUBLICATIONS

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K., "Goldbug BIG SEVEN open source crypto-messengers to be compared—or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.

Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019} Retrieved from Internet URL: https://www.secureauth.com/products/access-management/adaptive-authentication, 7 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-brw1103/mac, 3 pages.

Menghin, M.J., "Power Optimization Techniques for Near Field Communication Systems", 2014 Dissertation at Technical University of Graz [online]. Retrieved from Internet URL: https://diglib.tugraz.at/download.php?d=576a7b910d2d6&location=browse, 135 pages.

Mareli, M., et al., "Experimental evaluation of NFC reliability between an RFID tag and a smartphone", Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.

Author Unknown: "onetappayment™", [online] Jan. 24, 2019, [retrieved on Mar. 25, 2019]. Retrieved from Internet URL: https://www.payubiz.in/onetap, 4 pages.

Vu, et al., "Distinguishing users with capacitive touch communication", Proceedings of the Annual International Conference on Mobile Computing and Networking, 2012, MOBICOM. 10.1145/2348543.2348569.

Pourghomi, P., et al., "A Proposed NFC Payment Application," International Journal of Advanced Computer Science and Applications, 4(8):173-181 (2013).

Author unknown, "EMV Card Personalization Specification", EMVCo., LLC., specification version 1.0, (2003) 81 pages.

Ullmann et al., "On-Card" User Authentication for Contactless Smart Cards based on Gesture Recognition, paper presentation LNI proceedings, (2012) 12 pages.

\* cited by examiner

DEVICES AND METHODS FOR CONTACTLESS CARD ALIGNMENT WITH A FOLDABLE MOBILE DEVICE

FIELD OF THE INVENTION

The present disclosure relates to user and transaction card authentication, and more particularly, to devices and methods for contactless card alignment with a foldable mobile device.

BACKGROUND

Data security and transaction integrity are of critical importance to businesses and consumers. This need continues to grow as electronic transactions constitute an increasingly large share of commercial activity.

Email may be used as a tool to verify transactions, but email is susceptible to attack and vulnerable to hacking or other unauthorized access. Short message service (SMS) messages may also be used, but that is subject to compromise as well. Moreover, even data encryption algorithms, such as triple data encryption standard (DES) algorithms, have similar vulnerabilities.

While the growing use of chip-based financial/transaction cards provides more secure features over previous technology (e.g., magnetic strip cards) for in-person purchases, account access still may rely on log-in credentials (e.g., username and password) to confirm a cardholder's identity. However, if the log-in credentials are compromised, or the user's transaction card is stolen, another person could have access to the user's account.

These and other deficiencies exist. Accordingly, there is a need to provide users with an appropriate solution that overcomes these deficiencies to provide data security, authentication, and verification for transactions and transaction cards. Further, there is a need for an improved method of card/user authentication for account access.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Embodiments of the present disclosure provide a mobile device including a first component and a second component foldable with respect to one another between a first configuration and a second configuration. The mobile device may further include a screen interface on an interior side of the first component, and an alignment feature along the interior side, the alignment feature providing alignment for a contactless card with respect to the screen interface, wherein the contactless card is uncovered by the second component in the first configuration and covered by the second component in the second configuration.

Embodiments of the present disclosure provide a data transmission system, including a mobile device having a first component and a second component foldable with respect to one another between a first configuration and a second configuration. The data transmission system may further include a screen interface on an interior side of the first component, and an alignment feature along the interior side. The alignment feature provides alignment for a contactless card with respect to the screen interface, wherein the contactless card is uncovered by the second component in the first configuration and covered by the second component in the second configuration. The contactless card may further include a card reader having a processor and memory, wherein the card reader is operable to transmit data with the contactless card when the contactless card is aligned with the screen interface.

Embodiments of the present disclosure provide a method including providing a mobile device operable to transmit data with a contactless card, the mobile device comprising a first component and a second component, wherein the first and second components are foldable with respect to one another between an open configuration and a closed configuration, and wherein the contactless card is covered by the second component in the closed configuration and uncovered by the second component in the open configuration. The method may further include providing an alignment feature along an interior side of the first component, the alignment feature aiding alignment of the contactless card with respect to a screen interface of the first component. The method may further include determining whether the contactless card is aligned on the screen interface, and providing feedback regarding placement of the contactless card based on whether the contactless card is aligned on the screen interface.

BRIEF DESCRIPTION OF THE DRAWINGS

The accompanying drawings illustrate example approaches of the disclosure, including the practical application of the principles thereof, as follows.

Figure 1:
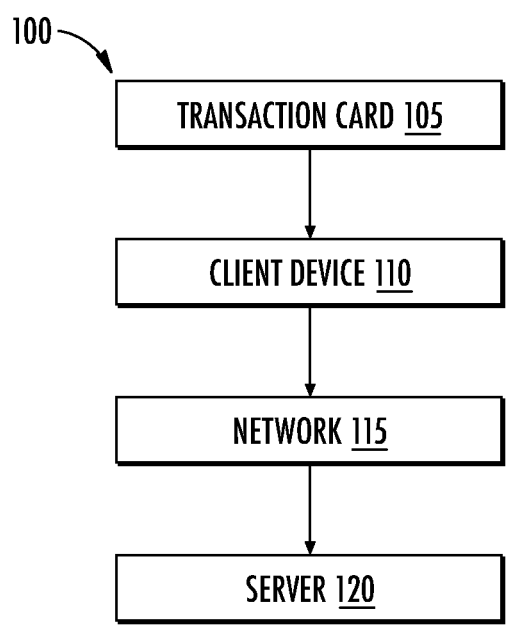
FIG. 1 is a diagram of a system according to an example embodiment.

The drawings are not necessarily to scale. The drawings are merely representations, not intended to portray specific parameters of the disclosure. The drawings are intended to depict example embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional

DETAILED DESCRIPTION

The following detailed description provides non-limiting representative examples referencing numerals to particularly describe features and teachings of different aspects of the disclosure. The embodiments described should be recognized as capable of implementation separately, or in combination, with other embodiments from the detailed description. A person of ordinary skill in the art reviewing the detailed description should be able to learn and understand the different described aspects of the disclosure. The detailed description should facilitate understanding of the disclosure to such an extent that other implementations, not specifically covered but within the knowledge of a person of skill in the art having read the description of embodiments, would be understood to be consistent with an application of the disclosure.

An objective of some embodiments of the present disclosure is to provide alignment and proper placement of a contactless card within a clamshell or foldable screen phone to optimize the near field communication (NFC) wireless read of the card. Contactless reading of a card by a mobile device is highly dependent on proper placement of the card with respect to the mobile device. In the present disclosure, the mobile device is able to provide feedback on criteria such as time, card placement, and/or signal strength. In various embodiments, the mobile device can operate in either an open or closed configuration, and with either a closed clamshell or foldable screen design. An alignment feature such as a mark or outline may be generated on a screen interface of the mobile device to a suggested placement of the card. Once the contactless card is placed on the screen interface, a readout may be generated to indicate feedback on the card placement. In some embodiments, the mobile device may then initiate data transmission between the card and a card reader when the card is acceptably positioned with respect to the mobile device.

FIG. 1 illustrates a system 100 according to an example embodiment. As further discussed below, the system 100 may include a card 105, a client device 110, a network 115, and a server 120. Although FIG. 1 illustrates single instances of the components, the system 100 may include any number of components.

The system 100 may include one or more contactless transaction cards 105 (hereinafter "card(s)"). The card 105 may be a credit or debit card, an RFID passport, or an access card. Although non-limiting, the card 105 may be made from one or more layers of polyvinyl chloride, polyvinyl chloride acetate, acrylonitrile butadiene styrene, polycarbonate, polyesters, anodized titanium, palladium, gold, carbon, paper, and biodegradable materials. In some examples, the card 105 may have physical characteristics compliant with the ID-1 format of the ISO/IEC 7810 standard, and the card 105 may otherwise be compliant with the ISO/IEC 14443 standard. However, it is understood that the card 105 according to the present disclosure may have different characteristics, and the present disclosure is not limited to any particular card design.

Described herein as contactless due to the method of communication by an identification chip, such as an RFID chip, the card 105 may also provide one or more functions requiring contact. For example, the card 105 may include a conventional magnetic stripe and/or a microchip connected to contacts present on an outer layer of the card 105. In some embodiments, the card 105 may be in wireless communication, utilizing NFC in an example, with the client device 110.

The system 100 may include the client device 110, which may be a network-enabled computer. As referred to herein, a network-enabled computer may include, but is not limited to, a computer device, or communications device including, e.g., a server, a network appliance, a personal computer, a workstation, a phone, a handheld PC, a personal digital assistant, a thin client, a fat client, an Internet browser, or other device. The client device 110 also may be a mobile device, for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device. In exemplary embodiments, the client device 110 is a configurable mobile device, such as a clamshell-type "flip-phone," or a foldable screen phone.

The client device 110 can include a processor and a memory, and it is understood that the processing circuitry may contain additional components, including, memories, error and parity/CRC checkers, data encoders, anticollision algorithms, controllers, command decoders, security primitives, and tamper proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touchscreen, keyboard, mouse, cursor-control device, microphone, digital camera, video recorder or camcorder. These devices may be used to enter information and interact with the software and other devices described herein.

In some examples, the client device 110 of the system 100 may execute one or more applications, such as software applications, that enable, for example, network communications with one or more components of the system 100 and transmit and/or receive data. The client device 110 may be in communication with one or more servers 120 via one or more networks 115, and may operate as a respective front-end to back-end pair with the server 120. The client device 110 may transmit, for example, from a mobile device application executing on the client device 110, one or more requests to the server 120. The one or more requests may be associated with retrieving data from the server 120. The server 120 may receive the one or more requests from the client device 110. Based on the one or more requests from the client device 110, the server 120 may be configured to retrieve the requested data from one or more databases (not shown). Based on receipt of the requested data from the one or more databases, the server 120 may be configured to transmit the received data to the client device 110, the received data being responsive to one or more requests.

The system 100 may include one or more networks 115. In some examples, the network 115 may be one or more of a wireless network, a wired network or any combination of wireless network and wired network, and may be configured to connect client device 110 to server 120. For example, the network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access (CDMA) based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, the network 115 may include, without limitation, telephone lines, fiber optics, IEEE Ethernet 902.3, a wide area network, a wireless personal area network, a LAN, or a global network such as the Internet. In addition, the network 115 may support an Internet network, a wireless communication network, a cellular network, or the like, or any combination thereof. The network 115 may further include one network, or any number of the exemplary types of networks mentioned above, operating as a stand-alone network or in cooperation with each other. The network 115 may utilize one or more protocols of one or more network elements to which they are communicatively coupled. The network 115 may translate to or from other protocols to one or more protocols of network devices. Although the network 115 is depicted as a single network, it should be appreciated that according to one or more examples, the network 115 may comprise a plurality of interconnected networks, such as, for example, the Internet, a service provider's network, a cable television network, corporate networks, such as credit card association networks, and home networks.

The system 100 may include one or more servers 120. In some examples, the server 120 may include one or more processors, which are coupled to memory. The server 120 may be configured as a central system, server or platform to control and call various data at different times to execute a plurality of workflow actions. The server 120 may be configured to connect to the one or more databases. The server 120 may be connected to at least one client device 110.

Figure 2:
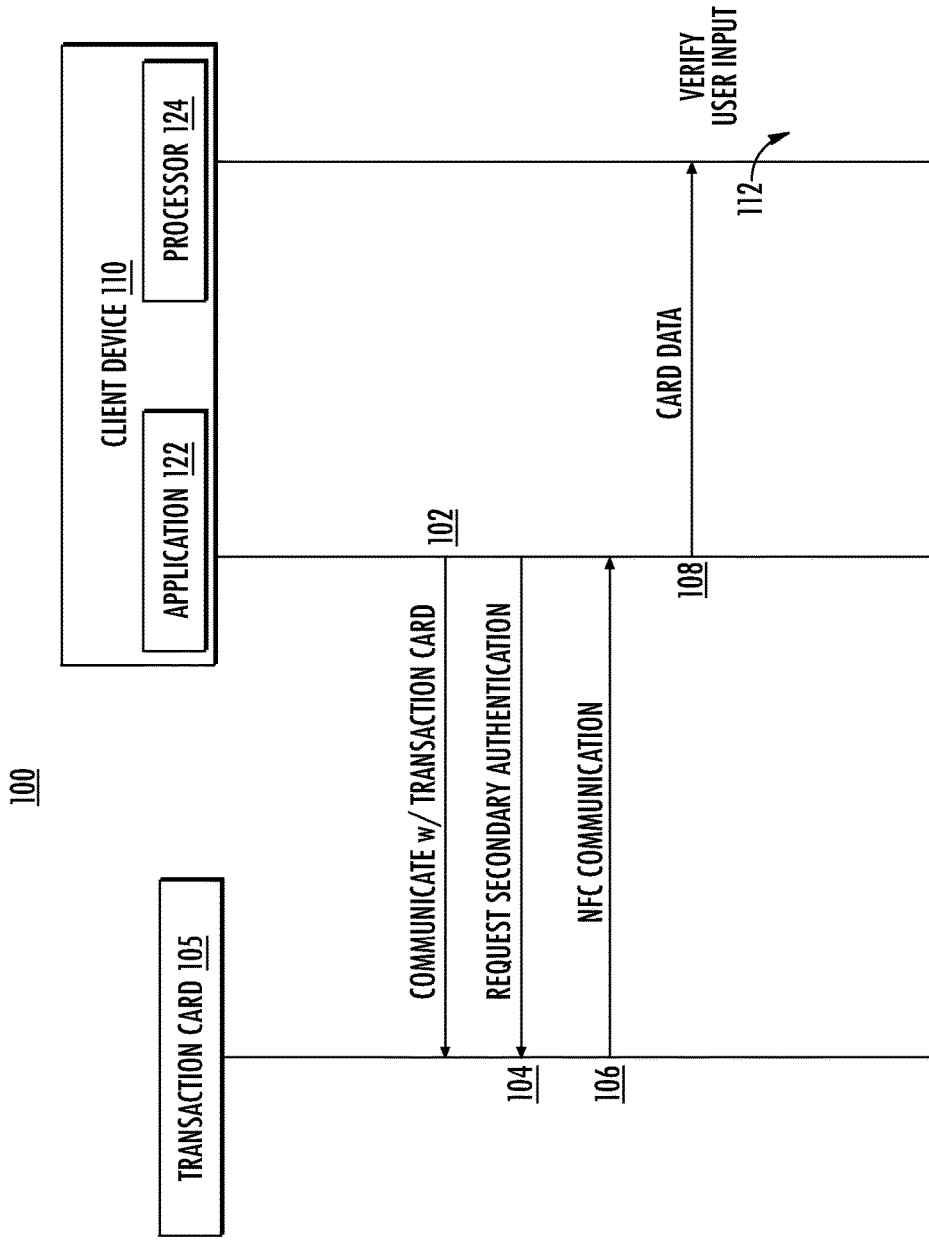
FIG. 2 is a diagram illustrating a sequence for providing authenticated access according to an example embodiment.

FIG. 2 is a timing diagram illustrating an example sequence for providing user/card authentication according to one or more embodiments of the present disclosure. The system 100 may comprise the card 105 and the client device 110, which may include an application 122 and a processor 124. FIG. 2 may reference similar components as illustrated in FIG. 1.

At process 102, the application 122 communicates with the card 105 to receive a primary authentication containing cardholder data in accordance with standard protocols. The primary authentication may be based on communication between the application 122 and the card 105, for example, when the card 105 is used during a transaction recognized by the application 122.

At process 104, the application 122 may request secondary authentication of the card 105. Communication between the application 122 and the card 105 may involve the card 105 being sufficiently close to a card reader (not shown) of the client device 110 to enable NFC data transfer between the application 122 and the card 105, as shown at process 106. In some embodiments, the card 105 is provided in direct physical contact with a screen interface of the client device 110.

At process 108, the application 122 communicates the transaction card data to the processor 124. At process 112, the processor 124 may execute instructions to determine whether to authenticate the transaction based on a comparison between the transaction card data and predetermined identification data.

In some examples, communication with the card 105 may be performed by a device other than the client device 110, such as the server 120 (e.g., as shown in FIG. 1). For example, the processor 124 may output data from the card 105 to the server 120. In some embodiments, the server 120 may verify a transaction and/or user identity by comparing the data received from the card 105 to transaction/user data accessible via the server 120. In other embodiments, the server 120 may verify the card 105 by retrieving an account passcode associated with the card 105, and compare the card data to the account passcode.

Figure 3:
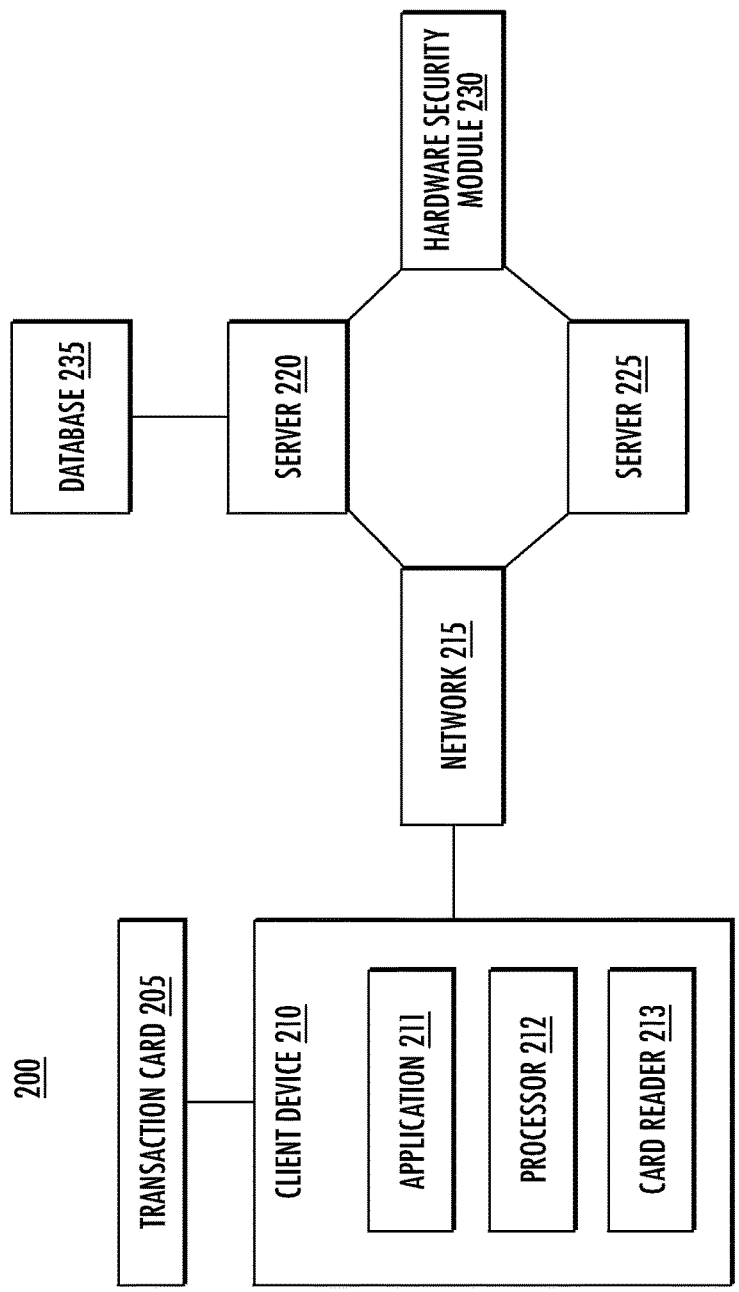
FIG. 3 is a diagram of a system using a transaction card according to an example embodiment.

FIG. 3 illustrates a data transmission system (hereinafter "system") 200 using a card 205, one or more client devices 210, a network 215, servers 220, 225, one or more hardware security modules 230, and a database 235. Although FIG. 3 illustrates single instances of the components, the system 200 may include any number of components.

The system 200 may include one or more cards 205. In some examples, the card 205 may be in wireless communication, for example NFC communication, with the client device 210. The card 205 may comprise one or more chips, such as a radio frequency identification chip, configured to communication via NFC or other short-range protocols. In other embodiments, the card 205 may communicate with the client device 210 through other means including, but not limited to, Bluetooth, satellite, Wi-Fi, wired communications, and/or any combination of wireless and wired connections. According to some embodiments, the card 205 may be configured to communicate with the card reader 213 of the client device 210 through NFC when the card 205 is within range of card reader 213. In other examples, communications with the card 205 may be accomplished through a physical interface, e.g., a universal serial bus interface or a card swipe interface.

The system 200 may include the client device 210, which may be a network-enabled computer. As referred to herein, a network-enabled computer may include, but is not limited to: e.g., a computer device, or communications device including, e.g., a server, a network appliance, a personal computer, a workstation, a mobile device, a phone, a handheld PC, a personal digital assistant, a thin client, a fat client, an Internet browser, or other device. One or more client devices 210 also may be a mobile device. A mobile device may include an iPhone, iPod, iPad from Apple® or any other mobile device running Apple's iOS® operating system, any device running Microsoft's Windows® Mobile operating system, any device running Google's Android® operating system, and/or any other smartphone or like wearable mobile device. In some examples, the client device 210 may be the same as, or similar to, the client device 110 as described with reference to FIG. 1 and FIG. 2.

The client device 210 may be in communication with one or more servers 220 and 225 via one or more networks 215. The client device 210 may transmit, for example from an application 211 executing on the client device 210, one or more requests to one or more servers 220 and 225. The one or more requests may be associated with retrieving data from one or more servers 220 and 225. The servers 220 and 225 may receive the one or more requests from the client device 210. Based on the one or more requests from the client device 210, the one or more servers 220 and 225 may be configured to retrieve the requested data from one or more databases 235. Based on receipt of the requested data from the one or more databases 235, one or more servers 220 and 225 may be configured to transmit the received data to client device 210, the received data being responsive to one or more requests. For example, in some non-limiting embodiments, predetermined user data associated with the card 205 and/or an account passcode associated with the card 205 may be retrieved from the one or more databases 235 in response to the requests from the servers 220 and 225.

In some embodiments, the system 200 may include one or more hardware security modules (HSM) 230. For example, one or more HSMs 230 may be configured to perform one or more cryptographic operations as disclosed herein. In some examples, one or more HSMs 230 may be configured as special purpose security devices that are configured to perform the one or more cryptographic operations. The HSMs 230 may be configured such that keys are never revealed outside the HSM 230, and instead, are maintained within the HSM 230. For example, one or more HSMs 230 may be configured to perform at least one of key derivations, decryption, and MAC operations. The one or more HSMs 230 may be contained within or may be in data communication with, the servers 220 and 225.

The system 200 may include one or more networks 215. In some examples, the network 215 may be one or more of a wireless network, a wired network or any combination of wireless network and wired network, and may be configured to connect the client device 210 to the servers 220, 225. For example, the network 215 may include one or more of a fiber optics network, a passive optical network, a cable network, a cellular network, an Internet network, a satellite network, a wireless LAN, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, RFID, Wi-Fi, and/or any combination of networks thereof. As a non-limiting example, communications from the card 205 and the client device 210 may comprise NFC communication, cellular network between the client device 210 and a carrier, and Internet between the carrier and a back-end.

In addition, the network 215 may include, without limitation, telephone lines, fiber optics, IEEE Ethernet 902.3, a wide area network, a wireless personal area network, a local area network, or a global network such as the Internet. In addition, the network 215 may support an Internet network, a wireless communication network, a cellular network, or the like, or any combination thereof. The network 215 may further include one network, or any number of the exemplary types of networks mentioned above, operating as a stand-alone network or in cooperation with each other. The network 215 may utilize one or more protocols of one or more network elements to which they are communicatively coupled. The network 215 may translate to or from other protocols to one or more protocols of network devices. Although the network 215 is depicted as a single network, it should be appreciated that according to one or more examples, the network 215 may comprise a plurality of interconnected networks, such as, for example, the Internet, a service provider's network, a cable television network, corporate networks, such as credit card association networks, and home networks.

In various examples according to the present disclosure, the client device 210 of the system 200 may execute one or more applications 211, and include one or more processors 212, and one or more card readers 213. For example, one or more applications 211, such as software applications, may be configured to enable, for example, network communications with one or more components of system 200 and transmit and/or receive data. It is understood that although only single instances of the components of client device 210 are illustrated in FIG. 3, any number of client devices 210 may be used. The card reader 213 may be configured to read from and/or communicate with the card 205. In conjunction with the one or more applications 211, the card reader 213 may communicate with the card 205.

The application 211 of any of the client devices 210 may communicate with the card 205 using short-range wireless communication (e.g., NFC). The application 211 may be configured to interface with the card reader 213 of the client device 210, which is configured to communicate with the card 205. As should be noted, those skilled in the art would understand that a distance of less than twenty centimeters is consistent with NFC range. As will be described in further detail below, the client device 210 is able to provide feedback on criteria such as time, card placement, and/or signal strength when the card 205 is placed on a screen interface of the client device 210.

The server 220 may be a web server in communication with the database 235. The server 225 may include an account server. In some examples, the server 220 may be configured to validate one or more credentials from the card 205 and/or client device 210 based on a comparison to one or more credentials in database 235. The server 225 may be configured to authorize one or more requests, such as a payment transaction, from the card 205 and/or client device 210 based on this comparison.

Figure 4A:
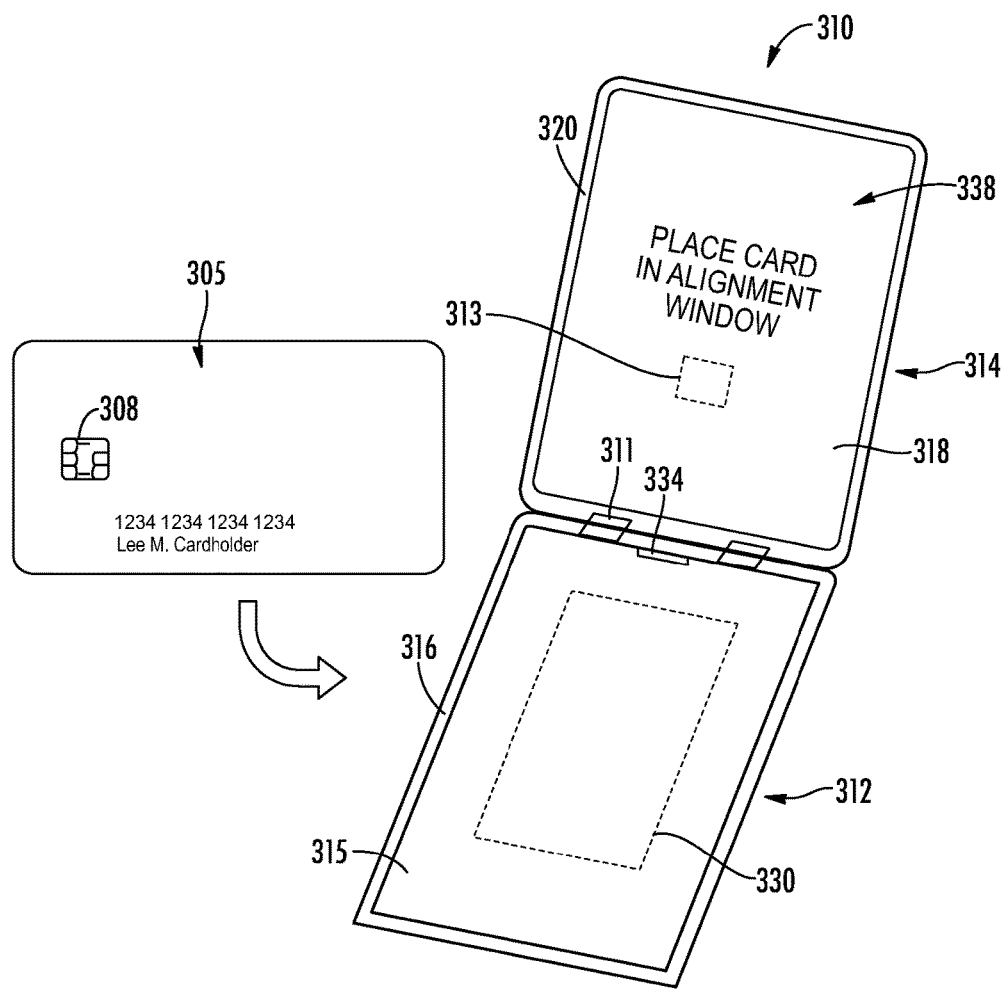
FIGS. 4A-4B are perspective views of a mobile device using a transaction card according to an example embodiment.
Figure 4B:
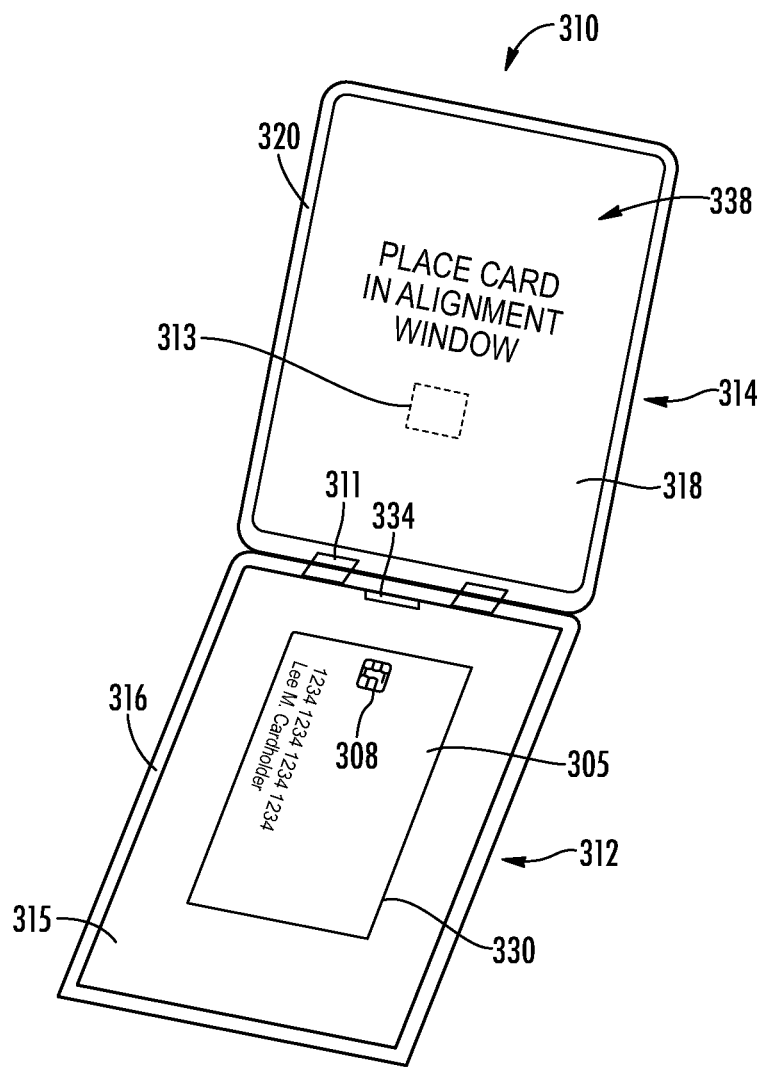

FIGS. 4A-4B illustrate an example card 305, which may be a payment card, such as a credit card, debit card, or gift card, issued by a service provider, in operation with a client device 310. In the embodiment shown, the client device 310 is a hinged, foldable mobile device. For example, the client device 310 may include a first component 312 and a second component 314 foldable with respect to one another between a first configuration (e.g., open) and a second configuration (e.g., closed). Although non-limiting, a set of hinges 311 may permit the first and second components 312, 314 to be rotatably coupled. The client device 310 may include a first screen interface 315 disposed along an interior side 316 of the first component 312, and a second screen interface 318 disposed along an interior side 320 of the second component 314. Optionally, the client device 310 may include a third screen interface 355 (FIG. 5A) disposed along an exterior side of the first or second components 312, 314.

One or more of the first screen interface 315, the second screen interface 318, and the third screen interface 355 may be a touch screen interface. That is, the screen interface is a display capable of monitoring changes in electrical current. For example, the first screen interface 315, the second screen interface 318, and the third screen interface 355 may each be a capacitive touch screen having a layer of capacitive material to hold an electrical charge, wherein touching the screen changes the amount of charge at a specific point of contact. In other embodiments, one or more of the screen interfaces may include a resistive screen, wherein pressure from a finger causes conductive and resistive layers of circuitry to touch each other, thus changing the circuits' resistance. Others interfaces may monitor changes in the reflection of waves, such as sound waves or beams of near-infrared light. Yet other interfaces may use transducers to measure changes in vibration caused when an object, such as a finger or stylus, hits the screen's surface or may use one or more cameras to monitor changes in light and shadow.

In some embodiments, the card 305 may include an identification chip 308 coupled (e.g., recessed or partially embedded) to a surface thereof. As used herein, the identification chip 308 may be any microprocessor device configured to exchange data electromagnetically, such as an RFID chip. The RFID chip may include a radio frequency inductor, volatile or non-volatile memory storage, a microprocessor, circuitry logic, and/or an antenna. While in some embodiments electromagnetic data communications from the RFID chip will take place at radio frequencies, other embodiments may exchange electromagnetic data at different frequencies. Although not shown, the card 305 may further include a magnetic stripe on an opposite side.

As described above, the card 305 may be built on a software platform operable on smart cards or other devices having limited memory, such as JavaCard, and one or more or more applications or applets may be securely executed. Applets may be added to contactless cards to provide a one-time password (OTP) for multifactor authentication (MFA) in various mobile application-based use cases. Applets may be configured to respond to one or more requests, such as near field data exchange requests, from a reader of the client device 310, such as a mobile NFC reader, and produce an NDEF message that comprises a cryptographically secure OTP encoded as an NDEF text tag.

Furthermore, the card 305 and a card reader 313 interact with each other to exchange information. In some embodiments, both the card 305 and the card reader 313 include one or more NFC communication devices, such as an antenna. Information and data can be exchanged between the antennae in a peer-to-peer (P2P) communication mode or a reader/writer (R/W) communication mode. In the P2P communication mode, the card 305 may be configured to operate according to an active communication mode and/or a passive communication mode.

As will be described further below, the card 305 is sufficiently proximate to the card reader such that information communication is inductively coupled onto the antenna of the card reader 313. The card reader 313 may demodulate the information communicated to recover the information. The card reader may respond to the information by modulating its corresponding information onto a second carrier wave and generating a second magnetic field by applying this modulated information communication to the antenna to provide a second modulated information communication in the active communication mode. Alternatively, the card reader may respond to the information by modulating its antenna with corresponding information to modulate a first carrier wave to provide the second modulated information communication in the passive communication mode. In some embodiments, the card 305 derives or harvests power from the client device 310 to recover, to process, and/or to provide a response to the information.

As further shown in FIGS. 4A-4B, the client device 310 may include an alignment feature 330 generated via the first screen interface 315 of the first component 312. The alignment feature 330 provides alignment for the card 305 with respect to the first screen interface 318, thereby positioning the card 305 in close proximity to the card reader 313 of the client device 310. The card reader 313 may be a component embedded within the first and/or second components 312, 314. As will be described in greater detail below, the card 305 may be uncovered by the second component 314 when the client device 310 is in a first, open configuration, and covered by the second component 314 when the client device 310 is in a second, closed configuration.

In some embodiments, the alignment feature 330 may be a visual indicator displayed via the first screen interface 315. For example, as shown, the alignment feature 330 may be an alignment window generally corresponding to the shape of the card 305. However, the alignment feature 330 may take on virtually any shape, configuration, color, etc. In yet other embodiments, the client device 310 may include one or more physical alignment features, such as an abutment 334 extending from at least one of the first component 312 or the second component 314. Rather than aligning the card 305 in the middle of the first screen interface 315, a user may simply slide the card 305 along the first screen interface 315 until it meets the abutment 334. This may be especially useful in the case the card 305 may be inserted into the client device 310 when the first and second components 312, 314 are in the second, closed position.

As further shown in FIG. 4A, the second screen interface 318 may display a prompt 338 inviting the user to position the card 305 atop the first screen interface 315. Once the card 305 is brought into position on the first screen interface 315, as shown in FIG. 4B, the client device 310 may be closed.

Figure 5A:
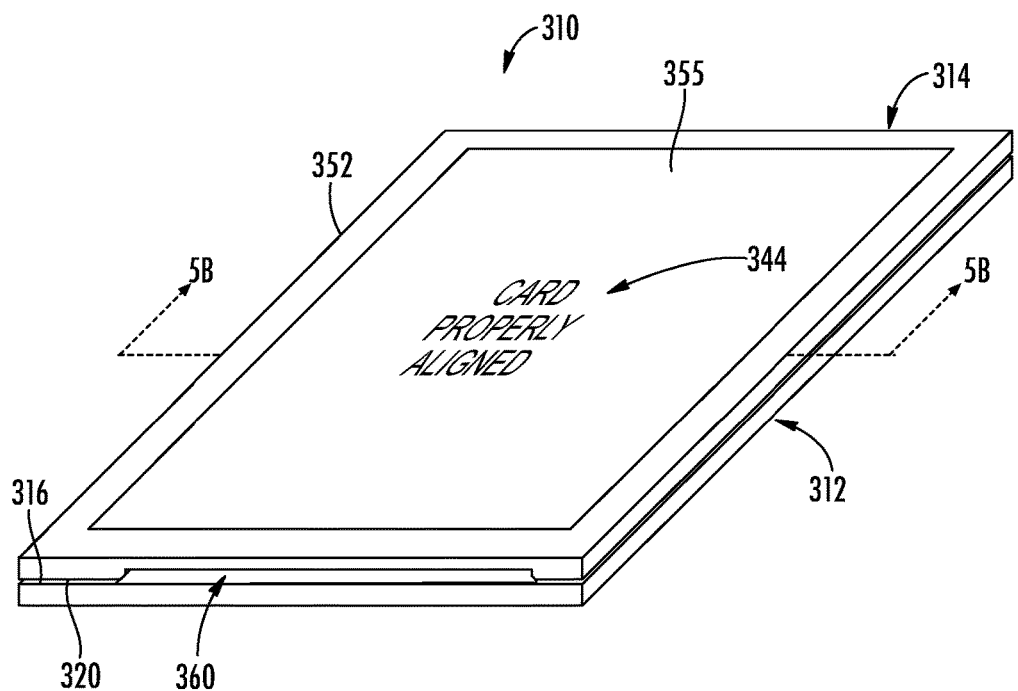
FIG. 5A is a perspective view of a mobile device operable with a transaction card according to an example embodiment.
Figure 5B:
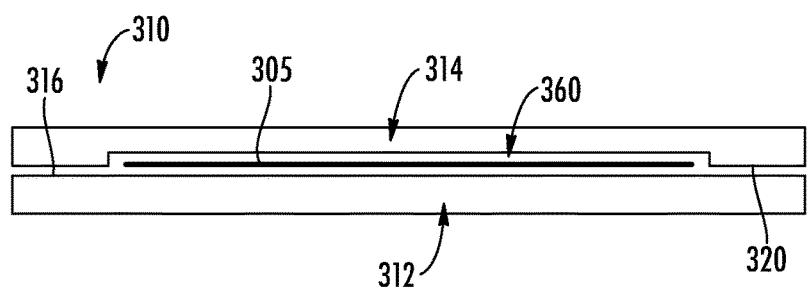
FIG. 5B is an end cross-sectional view of the mobile device and transaction card of FIG. 5A according to an example embodiment.

FIGS. 5A-5B illustrate the card 305 and the client device 310 in the second, closed configuration. As shown, the first component 312 and the second component 314 are rotatably coupled together such that the interior side 316 of the first component 312 and the interior side 320 of the second component 314 are brought into abutment with one another to sandwich the card 305 therebetween. Shown along the exterior side 352 of the second component 314 is the optional third screen interface 355. In some embodiments, feedback may be provided to the user via the third screen interface 355 when the client device 310 is in the second, closed position. The third screen interface 355 may provide feedback 344 on criteria such as time, card placement, and/or signal strength when the card 305 is placed between the first and second components 312, 314. Additionally, the third screen interface 355 may generate and display a prompt inviting the user to position the card 305 between the between the first and second components 312, 314.

As shown, the feedback 344 may be a textual and/or graphical message indicating whether the card is properly aligned. If the card 305 is deemed not to be properly aligned, the feedback 344 may indicate how the card can be repositioned (e.g., move the card up/down, right/left, etc.). If the card is 305 is properly aligned, the feedback 344 may instruct the user to proceed. In yet another example, the third screen interface 355 may provide feedback to the user regarding signal strength. A textual and/or graphical message may indicate a signal strength, wherein a predetermined NFC signal strength threshold may need to be achieved before the card 305 is read by the card reader 313. If the signal strength is below the threshold, the feedback 344 may indicate ways to increase the signal, such as repositioning the card.

In some embodiments, the client device 310 may include a slot 360 recessed into the first and/or second components 312, 314. The slot 360 further aids with the alignment of the card 305, and may permit the card 305 to be inserted between the first and second components 312, 314 while the client device 310 is in the second, closed position. In some embodiments, the card 305 will only be read when the client device 310 is in the second, closed position. For example, the card 305 may require close physical proximity of both the first and second components 312, 314 to initiate data transmission. That is, closing the second component 314 brings the reader into <2 cm contact with the card reader 313. The closing of the client device 310 may lock the card 305 into position for optimal reading. In other embodiments, the card 305 can be read when the client device 310 is in the first, open position when the card 305 is in proper alignment along the first component 312 and the card reader 313 is located in the first component 312.

Figure 6:
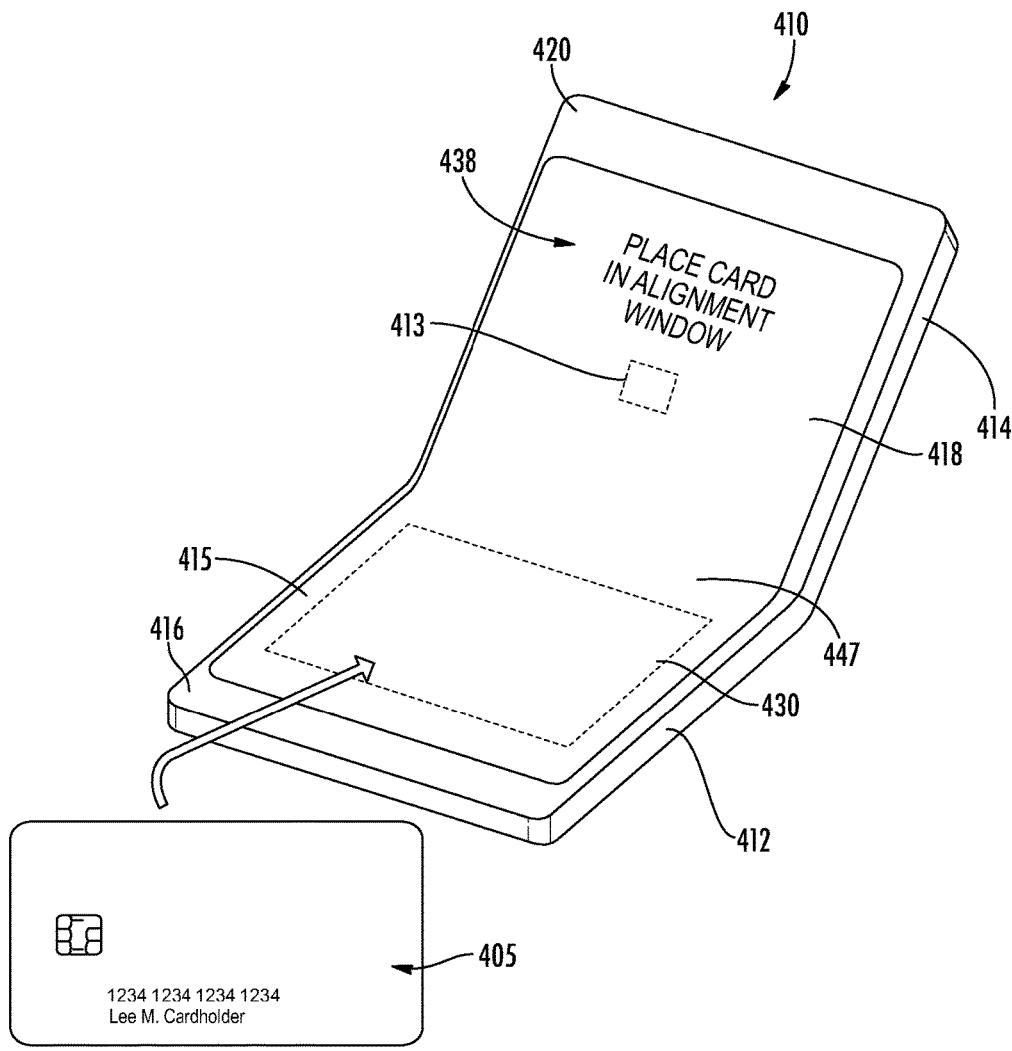
FIG. 6 is a perspective view of a mobile device operable with a transaction card according to an example embodiment.

FIG. 6 illustrates an example client device 410 operable with a card 405, which may be a payment card, such as a credit card, debit card, or gift card, issued by a service provider. In the embodiment shown, the client device 410 is a foldable smartphone with a flexible screen. However, the client device 410 may alternatively be a tablet computer, a personal digital assistant, a media player, an e-book reader, or a display. As shown, the client device 410 may include a first portion 412 and a second portion 414 foldable with respect to one another between a first configuration (e.g., open, flat) and a second configuration (e.g., closed). Although non-limiting, the first and second portions 412, 414 may be foldable/rotatable about a fold position 447, which may extend across the client device 410. Although not shown, the fold position 447 may be the result of corresponding mechanical components within the client device 410. The fold position 447 may divide the client device 410 into a first screen interface 415 disposed along an interior side 416 of the first portion 412, and a second screen interface 418 disposed along an interior side 420 of the second portion 414. Optionally, the client device 410 may include a third screen interface (not shown) disposed along an exterior side of the first and/or second portions 412, 414.

As shown, the first and second screen interfaces 415, 418 may be part of a single, continuous screen interface extending across the first portion 412 and the second portion 414. In an example embodiment, the first and second screen interfaces 415, 418 combine to provide a touch sensitive display including a touch sensor for detecting the touch of the user on or in proximity thereof. The touch sensor may include a resistive, a surface acoustic wave, a capacitive (e.g., a surface capacitance), a projected capacitance, a mutual capacitance, or self-capacitance (e.g., an infrared), an optical, a dispersive signal and/or acoustic pulse recognition touch sensor or an array thereof.

The first and second screen interfaces 415, 418 can be made of plastic, thin glass, thin metal or elastomer. In some embodiments, first and second screen interfaces 415, 418 may include resilient materials, such as a gel, an elastomer, foam, rubber or silicone or other resilient structures such as hollow, woven, folded or coiled structures, or a folding membrane of e.g. thin polymer of fabric. In the first configuration, the first and second screen interfaces 415, 418 may be substantially planar with one another. In the second configuration, the interior side 416 of the first portion 412 and the interior side 420 of the second portion 414 may be brought into contact/and or in close proximity to one another.

Furthermore, the card 405 and a card reader 413 interact with each other to exchange information. In some embodiments, both the card 405 and the card reader 413 include one or more NFC communication devices, such as an antenna. Information and data can be exchanged between the antennae in a peer-to-peer (P2P) communication mode or a reader/writer (R/W) communication mode. In the P2P communication mode, the card 405 may be configured to operate according to an active communication mode and/or a passive communication mode.

When the client device 410 is in the second, closed position, the card 405 is sufficiently proximate to the card reader such that information communication is inductively coupled onto the antenna of the card reader 413. The card reader 413 may demodulate the information communicated to recover the information. The card reader may respond to the information by modulating its corresponding information onto a second carrier wave and generating a second magnetic field by applying this modulated information communication to the antenna to provide a second modulated information communication in the active communication mode. Alternatively, the card reader may respond to the information by modulating its antenna with corresponding information to modulate a first carrier wave to provide the second modulated information communication in the passive communication mode. In some embodiments, the card 405 derives or harvests power from the client device 410 to recover, to process, and/or to provide a response to the information.

As further shown in FIG. 6, the client device 410 may include an alignment feature 430 generated via the first screen interface 415 of the first portion 412. The alignment feature 430 provides alignment for the card 405 with respect to the first screen interface 412, thereby positioning the card 405 in close proximity to the card reader 413 of the client device 410 when the second portion 414 is closed. In the embodiment shown, the card reader 413 may be embedded within the second portion 414.

As further shown in FIG. 6, the second screen interface 418 may display a prompt 438 inviting the user to position the card 405 atop the first screen interface 415. Once the card 405 is brought into position on the first screen interface 415, the client device 410 may be closed to initiate communication between the card reader 413 and the card 405.

Figure 7:
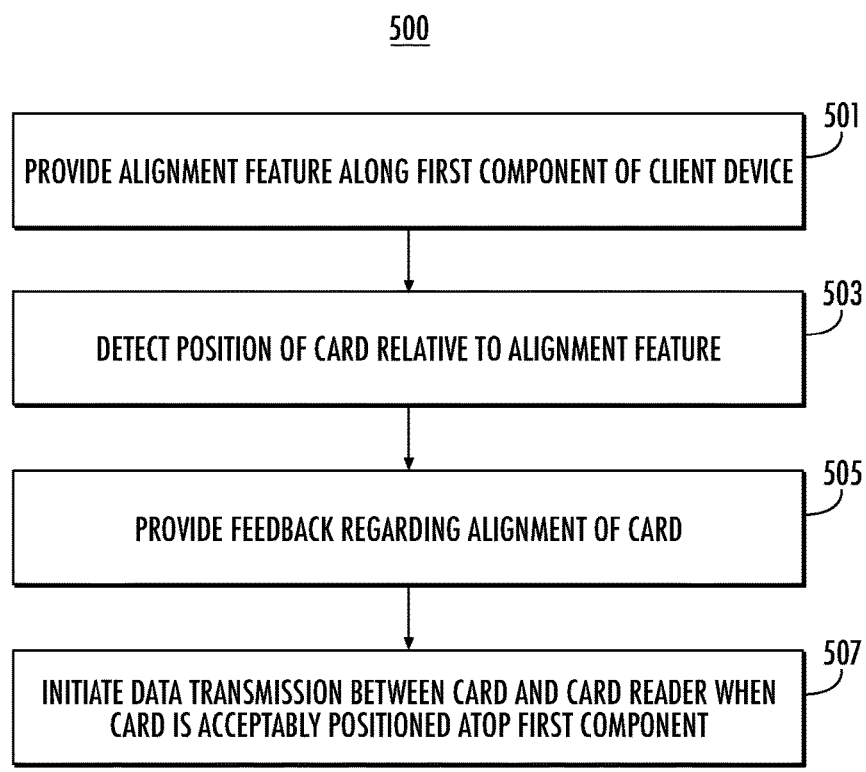
FIG. 7 is a flowchart illustrating a method for transaction card alignment on a mobile device according to an example embodiment.

FIG. 7 is a flowchart illustrating a method 500 according to an example embodiment. The method 500 will be described with reference to the client device 310 and card 305 of FIGS. 4A-5B. As shown, at block 501, the method 500 may include providing the alignment feature 330 along the first component 312 of the client device 310. At block 503, the method 500 may include detecting a position of the card 305 relative to the alignment feature 330 to determine the alignment of the card 305 relative to the card reader 313. At block 505, the method 500 may include providing feedback regarding the alignment of the card 305. In the case the card 305 is acceptably positioned atop the first component 312, the feedback 344 displayed via the first, second, and/or third screen interfaces may indicate as such. In the case the card 305 is not acceptably positioned atop the first component 312, the feedback 344 may indicate ways for adjusting the card 305. At block 507, the method 500 may then include initiating data transmission between the card 305 and the card reader 313 when the card 305 is acceptably positioned atop the first component 312. In some embodiments, data transmission between the card 305 and the card reader 313 is only initiated when card alignment has been achieved and the client device 310 is in the second, closed position.

Figure 8:
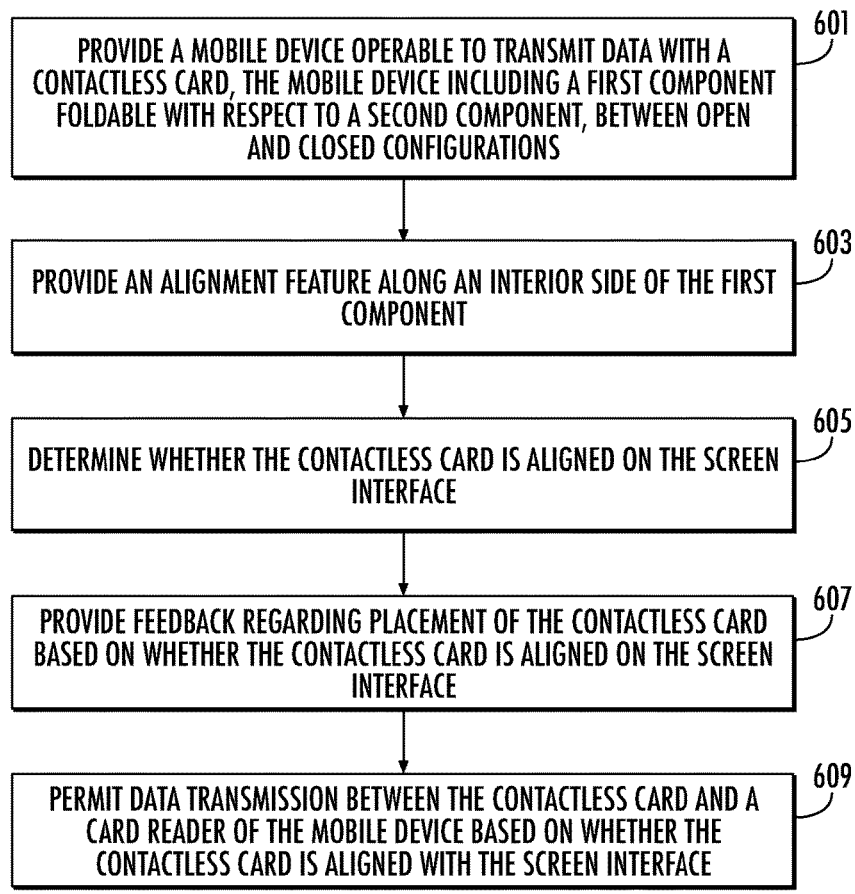
FIG. 8 is a flowchart illustrating a method for transaction card alignment on a mobile device according to an example embodiment.

FIG. 8 is a flowchart illustrating a method 600 according to an example embodiment. At block 601, the method 600 may include providing a mobile device operable to transmit data with a contactless card, the mobile device including a first component foldable with respect to a second component, between open and closed configurations. In some embodiments, the contactless card is covered by the second component in the closed configuration and uncovered by the second component in the open configuration. In some embodiments, the mobile device is a clamshell-type phone or a foldable screen phone. In some embodiments, the client device is a foldable smartphone with one or more flexible screens. In some embodiments, the mobile device has multiple screen interfaces. In some embodiments, the screen interfaces may be touch screen capable. In some embodiments, the contactless card may be a transaction card, such as a debit and/or credit card, capable of NFC communication. In some embodiments, a slot is recessed into at least one of the first component and the second component, wherein the contactless card may be received through the slot when the first and second components are in the closed configuration.

At block 603, the method 600 may further include providing an alignment feature along with an interior side of the first component. The alignment feature aids alignment of the contactless card with respect to a screen interface of the first component. In some embodiments, the alignment feature is a visual indicator, such as a dotted alignment window generally corresponding to the shape of the contactless card. In some embodiments, the alignment feature is generated and displayed via the first screen interface. In other embodiments, the alignment feature may be an abutment extending from at least one of the first component and the second component.

At block 605, the method 600 may include determining whether the contactless card is aligned on the screen interface. At block 607, the method 600 may include providing feedback regarding placement of the contactless card based on whether the contactless card is aligned on the screen interface. In some embodiments, the feedback is provided via the second screen interface disposed along an interior side of the second component. In some embodiments, the second screen interface displays feedback on criteria such as time, card placement, and/or signal strength. Other types of feedback may also be provided to the user.

At block 609, the method 600 may further include permitting data transmission between the contactless card and a card reader of the mobile device based on whether the contactless card is aligned with the screen interface. In some embodiments, the method may include determining a configuration change of the first and second components from the open configuration to the closed configuration and then initiating data transmission between the contactless card and the card reader of the mobile device in response to the configuration change of the first and second components. For example, data transmission may not be permitted or possible unless the first and second components are in the closed configuration.

In some examples, the transaction card can selectively communicate information depending upon the recipient device. Once the user input is received, the transaction card can recognize the device to which the input is directed, and based on this recognition the transaction card can provide appropriate data for that device. This advantageously allows the transaction card to transmit only the information required to complete the instant action or transaction, such as a payment or card authentication. By limiting the transmission of data and avoiding the transmission of unnecessary data, both efficiency and data security can be improved. The recognition and selective communication of information can be applied to various scenarios, including card activation, balance transfers, account access attempts, commercial transactions, etc., as a way to reduce fraud.

If the transaction card input is directed to a device running Apple's iOS® operating system, e.g., an iPhone, iPod, or iPad, the transaction card can recognize the iOS® operating system and transmit data appropriate data to communicate with this device. For example, the transaction card can provide the encrypted identity information necessary to authenticate the card using NDEF tags via, e.g., NFC. Similarly, if the transaction card input is directed to a device running the Android® operating system, e.g., an Android® smartphone or tablet, the transaction card can recognize the Android® operating system and transmit appropriate and data to communicate with this device (such as the encrypted identity information necessary for authentication by the methods described herein).

As another example, the transaction card input can be directed to a POS device, including without limitation a kiosk, a checkout register, a payment station, or another terminal. Upon proper alignment of the transaction card, the transaction card can recognize the POS device and transmit only the information necessary for the action or transaction. For example, upon recognition of a POS device used to complete a commercial transaction, the transaction card can communicate payment information necessary to complete the transaction under the EMV standard.

In some examples, the POS devices participating in the transaction can require or specify additional information, e.g., device-specific information, location-specific information, and transaction-specific information, that is to be provided by the transaction card. For example, once the POS device receives a data communication from the transaction card, the POS device can recognize the transaction card and request the additional information necessary to complete an action or transaction, such as a sequence input to the overlay via the indicia.

In some examples, data may be collected on user input behaviors as biometric/gestural authentication. For example, a unique identifier that is cryptographically secure and not susceptible to interception may be transmitted to one or more backend services. The unique identifier may be configured to look up secondary information about individual. The secondary information may comprise personally identifiable information about the user. In some examples, the secondary information may be stored within the transaction card.

Although the illustrative methods 500 and 600 are described as a series of acts or events, the present disclosure is not limited by the illustrated ordering of such acts or events unless specifically stated. For example, some acts may occur in different orders and/or concurrently with other acts or events apart from those illustrated and/or described herein, in accordance with the disclosure. In addition, not all illustrated acts or events may be necessary to implement a methodology in accordance with the present disclosure.

Throughout the specification and the claims, the following terms take at least the meanings explicitly associated herein, unless the context clearly dictates otherwise. The term "or" is intended to mean an inclusive "or." Further, the terms "a," "an," and "the" are intended to mean one or more unless specified otherwise or clear from the context to be directed to a singular form.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "some examples," "other examples," "one example," "an example," "various examples," "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrases "in one example," "in one embodiment," or "in one implementation" does not necessarily refer to the same example, embodiment, or implementation, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A mobile device, comprising:
a first component and a second component foldable with respect to one another between a first configuration and a second configuration;
a screen interface on an interior side of the first component;
an alignment feature along the interior side, the alignment feature providing alignment for a contactless card with respect to the screen interface, wherein the contactless card is uncovered by the second component in the first configuration and covered by the second component in the second configuration; and
a card reader communicable with the contactless card, wherein data transmission is initiated between the contactless card and the card reader in response to a change of the first and second components from the first configuration to the second configuration.

2. The mobile device of claim 1, further comprising a second screen interface on the second component, the second screen interface operable for providing positioning feedback of the contactless card with respect to the screen interface.

3. The mobile device of claim 2, wherein at least one of the screen interface and the second screen interface is a capacitive touch screen interface.

4. The mobile device of claim 2, wherein the second screen interface is disposed along an interior side of the second component.

5. The mobile device of claim 1, wherein the first component is rotatably coupled with the second component, and wherein the contactless card is sandwiched between the first component and the second component when the second component is in the second configuration.

6. The mobile device of claim 1, wherein the alignment feature comprises a visual indicator displayed via the screen interface.

7. The mobile device of claim 1, wherein the alignment feature comprises an abutment extending from at least one of the first component and the second component.

8. The mobile device of claim 1, further comprising a slot recessed into at least one of: the first component and the second component, wherein the slot permits the contactless card to be inserted between the first component and the second component when the second component is in the second configuration.

9. The mobile device of claim 1, the card reader disposed within at least one of: the first component, and the second component.

10. A data transmission system, comprising:
a mobile device comprising:
a first component and a second component foldable with respect to one another between a first configuration and a second configuration;
a screen interface on an interior side of the first component;
an alignment feature along the interior side, the alignment feature providing alignment for a contactless card with respect to the screen interface, wherein the contactless card is uncovered by the second component in the first configuration and covered by the second component in the second configuration; and
a card reader having a processor and memory, wherein the card reader is operable to transmit data with the contactless card when the contactless card is aligned with the screen interface, and wherein data transmission is initiated between the contactless card and the card reader in response to a change of the first and second components from the first configuration to the second configuration.

11. The data transmission system of claim 10, further comprising a second screen interface disposed along an interior side of the second component, the second screen interface operable to provide positioning feedback of the contactless card with respect to the screen interface.

12. The data transmission system of claim 10, wherein the first component is rotatably coupled with the second component, and wherein the contactless card is sandwiched between the first component and the second component when the second component is in the second configuration.

13. The data transmission system of claim 10, wherein the alignment feature comprises a visual indicator displayed via the screen interface.

14. The data transmission system of claim 10, wherein the alignment feature comprises an abutment extending from at least one of the first component and the second component, the abutment operable to engage the contactless card.

15. The data transmission system of claim 10, further comprising a slot recessed into at least one of: the first component and the second component, wherein the slot permits the contactless card to be inserted between the first component and the second component when the second component is in the second configuration.

16. A method comprising:
providing a mobile device operable to transmit data with a contactless card, the mobile device comprising a first component and a second component, wherein the first and second components are foldable with respect to one another between an open configuration and a closed configuration, and wherein the contactless card is covered by the second component in the closed configuration and uncovered by the second component in the open configuration;

providing an alignment feature along an interior side of the first component, the alignment feature aiding alignment of the contactless card with respect to a screen interface of the first component;

determining whether the contactless card is aligned on the screen interface;

determining a configuration change of the first and second components from the open configuration to the closed configuration; and initiating data transmission between the contactless card and the card reader of the mobile device in response to the configuration change of the first and second components.

17. The method of claim 16, further comprising permitting data transmission between the contactless card and a card reader of the mobile device based on whether the contactless card is aligned with the screen interface.

18. The method of claim 17, further comprising
providing feedback regarding placement of the contactless card based on whether the contactless card is aligned on the screen interface.

19. The method of claim 16, further comprising visibly displaying the alignment feature via the screen interface.

20. The method of claim 16, further comprising:
providing a slot recessed into at least one of: the first component and the second component; and
receiving the contactless card through the slot when the first and second components are in the closed configuration.

* * * * *